Oct. 31, 1950  A. K. SCHENCK  2,528,086
RELAY CONTACTS OF CONDUCTING RUBBER
Filed Nov. 8, 1946

INVENTOR
A. K. SCHENCK
BY
J. W. Schmied
ATTORNEY

Patented Oct. 31, 1950

2,528,086

UNITED STATES PATENT OFFICE 2,528,086

RELAY CONTACTS OF CONDUCTING RUBBER

Alfred K. Schenck, Glen Ridge, N. J., assignor to Bell Telephone Laboratories, Incorporated, New York, N. Y., a corporation of New York Application November 8, 1946, Serial No. 708,577

8 Claims. (Cl. 200—166)

This invention relates to electrical contacts and more specifically to contacts of relays which are fabricated of conductive rubber or which employ conductive rubber as a closely cooperating part for well known metal contacts.

It is well known in the art that conductive rubber has some properties of a resilient rubber insulator and some properties of a conductor. The usual conductive portion of such a composition is a carbon derivative such as acetylene black or carbon black, which latter terms will be readily recognized. Such compositions as conductive rubber generally comprise a homogeneous vulcanized mixture of a pure or synthetic rubber binder with one of the well known forms of carbon black in suitable proportions. There has been no particular effort in prior art to provide such compositions with specific values for the electrical resistance and mechanical strength since the uses previously known, such as electronic discharge paths or as corona prevention shields, required in particular no specifically low resistance nor a specific value of high resistance.

It has been discovered that conductive rubber, such as a vulcanized homogeneous mixture of rubber and acetylene black, when used as the contact material of relays exhibits many properties advantageous to such application providing the electrical resistivity of the composition is made low enough. The resistivity can be controlled to a certain extent by the ratio of carbon to polymer as is well known and selection of low values is advised for the use disclosed herein.

In this disclosure are set forth ways of utilizing conductive rubber as the contact tips for contact carrying springs of electromagnetic relays. The contacts may be of conductive rubber on both cooperating relay springs; one may be conductive rubber and may cooperate with the usual metal contact; one may be of conductive rubber cooperating with a metal contact embedded in conductive rubber; both cooperating contacts may be of metal but embedded in masses of conductive rubber. It has been found that conductive rubber made up of approximately equal parts by weight of rubber and acetylene black together with anti-aging and vulcanizing agents is a composition satisfactory for this application. There are numerous variations of the manner of employing conductive rubber as relay contacts as will be obvious from the subsequent disclosure. By relay contacts, it is intended that the application of this composition shall include all manner of relays which employ moving elements such as vacuum tube relays as well as the usual electromagnetic core-armature type which is used as an exemplary embodiment in this disclosure.

One object of this invention is to provide electrical contacts which are essentially free from open or dirty conditions caused by foreign particles.

Another object is to provide contacts which are essentially free from self-locking or self-welding conditions.

A third object of the invention is to inhibit or prevent undesirable chatter of such contacts.

Still another object of this invention is to provide electrical contacts, the contact resistance of which varies inversely as the contact pressure or "follow" to thereby tend to reduce ill effects of circuit transients on opening and closing of said contacts.

Another object is to provide electrical contacts having the above advantageous effects and which are simple in construction, easy to apply or use and low in cost of manufacture and application.

The following specification is set forth to explain the method of assembling conductive rubber contacts or conductive rubber contact carrying means to standard well known relay springs as an exemplary disclosure of my invention and to set forth advantages of such use of this material. As a part of this disclosure a drawing is provided, of which the following are general descriptions of the various figures.

Figure 1:
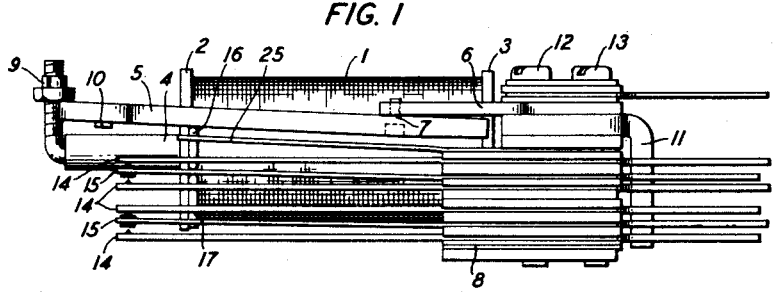
Fig. 1 is an elevation view of a well known type of electromagnetic relay upon the springs of which are assembled conductive rubber contacts according to one embodiment of my invention.

In Fig. 1 is shown an electromagnetic relay of well known construction in the telephone art. A winding 1 is mounted about core 4 between spool heads 2 and 3. Armature 5 is pin-hinged to the core return piece 6 at area 7 in a well known manner. Other constructional features of common knowledge are shown and recognized as frame mounting bracket 11, spring pile-up section 8 secured to the relay frame by means of screws 12 and 13, unoperated armature adjustable back stop nut 9 and operated armature stop pin 10. The contact springs comprise relatively stationary springs such as 14 and relatively movable springs such as 15 insulated from each other in the pile-up 8. Spring 25, carrying spring separator 16 rigidly fixed on the end thereof, is pretensioned to assist in biasing armature 5 to the unoperated position shown. Separator 16 passes freely through a clearance hole in the topmost spring 14 and rests upon the top surface of the upper spring 15. The spring separator 17 is fixed to the lower spring 15 and passes freely through clearance holes in both middle springs 14 to rest against the under surface of the upper spring 15.

It is seen that under unoperated conditions of the relay of Fig. 1 the uppermost spring 14 is in contact with upper spring 15 and that the second from the bottom spring 14 is in contact with the lower spring 15. Upon energization of winding 1 the armature 5 will be attracted to its operated position and in so moving will actuate spring separator 16 to move upper contact spring 15 which in turn will move spring separator 17. In moving by this means the spring separators 16 and 17 will break the previous contacts and transfer the contacts of springs 15 to the contacts of their respective lower springs 14.

Figure 2:
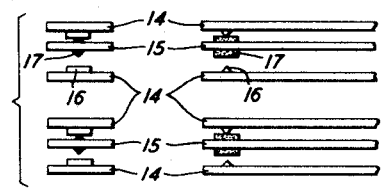
Figs. 2 and 3 are enlarged views of the contact carrying ends of the springs of the relay shown in Fig. 1.
Figure 3:
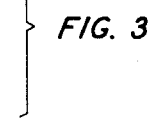

Figs. 2 and 3 are enlarged views of the contact carrying ends of the springs 14 and 15 of the relay illustrated in Fig. 1. In this particular arrangement of contacts the ones designated 16 for instance are the usual metal type, those designated 17 being of conductive rubber. In all views, as provided with legends in some instances, the sections of conductive rubber structure are indicated by solid color and metal and adhering substances are indicated otherwise. Although the invention has been illustrated by means of square or oblong shaped conductive rubber contacts the spirit of the invention obviously contemplates other shapes such as round, oval, triangular and other geometrical or irregular configurations.

Figure 4:
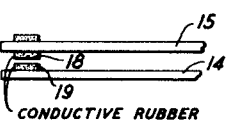
Figs. 4, 5, 6 and 7 illustrate two additional variations of the type of contacts of conducting rubber which may be employed on the relay of Fig. 1.
Figure 6:
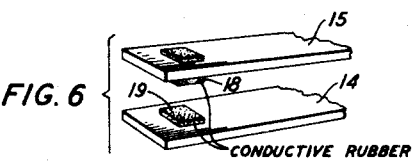
Figure 7:
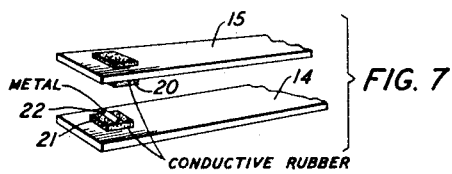

Figs. 4 and 6 illustrate the use of conductive rubber for both of a pair of cooperating contacts such as 18 and 19 on cooperating springs 14 and 15. In this arrangement the contacts are fixed to the respective springs by a means to be explained hereinafter in connection with Figs. 8 and 9.

Figure 5:
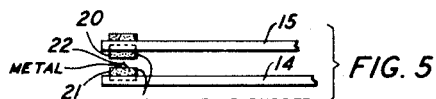

In Figs. 5 and 6 are shown one contact, such as 20 on spring 15, made of conductive rubber and similar to the type illustrated in Figs. 4 and 6, and a contact cooperating therewith, such as 21 and 22 of spring 14, made of the usual metal type 22 imbedded in the conductive rubber pad 21. In this arrangement the contact assemblies are fixed to their respective springs by a method to be explained hereinafter in connection with Figs. 10 and 11.

Figure 8:
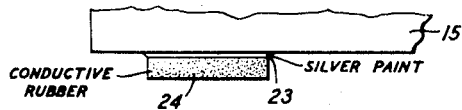
Figs. 8, 9, 10 and 11 are provided in exaggerated form to more clearly illustrate constructional features of the contacts illustrated in previous figures.
Figure 9:
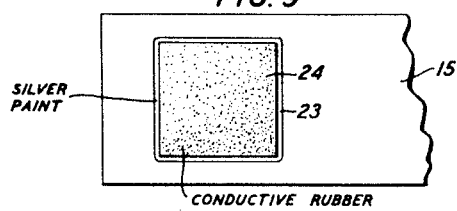

In Figs. 8 and 9 a conductive rubber contact 24 is shown bonded to a contact spring such as 15 by means of a layer or layers of silver paint 23 interposed therebetween. Any conducting adhesive suitable for this application may be used as exemplified by the silver paint. In practice the spring 15, which could be of nickel silver, is cleaned with a fine abrasive and with a cleansing agent and given one coat of silver paint. The contact 24 is cleaned to remove such impurities as grease and dirt and is given one coat of silver paint on one of its flat sides. After both have dried for several hours at room temperature, or equivalent under accelerated heating means, the spring 15 is given an additional coat of paint, the contact 24 pressed onto spring 15 in the proper place and the assembled article allowed to air dry over night, or suitably accelerated means known to industry. This silver paint which consists of finely divided silver in a volatile vehicle is not normally considered an adhesive but is intended as an electrode material. However, in the practice of the invention it has been discovered that for the purpose of applying the invention as previously described this paint permits an adhesive shearing strength of for instance 675 grams to break loose such a conducting pad as 24 in Figs. 8 or 9 having its large surface area .28" by .14". Actual operation of a relay equipped with conductive rubber contacts bonded to the relay springs by this means have adhered to their respective springs for the duration of at least twenty-five million consecutive contacting operations.

Figure 10:
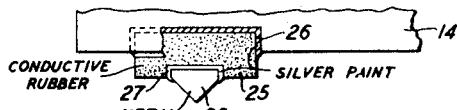
Figure 11:
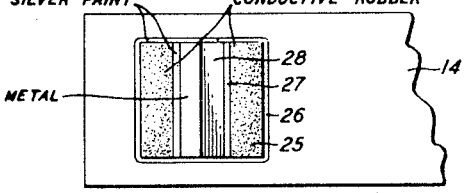

The conductive rubber pad 25 in Figs. 10 and 11 is shown to be bonded by silver paint 26 to a cut out portion of spring 14, into which cut out portion the pad 25 fits snugly. In like manner a well known type of metal contact 28 is bonded as an insert into a similar cut out portion of the pad 25.

There are many variations of this invention but these previously described are exemplary of the utility of the invention. Other embodiments will occur to those skilled in the art and such are within the spirit of this invention.

Observations of laboratory tests of such arrangements as are disclosed herein have indicated that the conducting material will cold flow around any normal size dirt particles and make effective electrical contact irrespective thereof. The rubber surfaces inherently provide a multiple contacting area which might be described as a poly-contact.

The nature of the material is such that locking or welding is practically impossible due to poor surface cohesion of any material which might become loose and threaten such a condition.

An interesting characteristic of this type of electrical contact is that it provides a sloping curve of resistance versus contact follow variation. The resistance of these contacts varies inversely as the pressure applied thereto, or "follow" as the term is well known to denote. The resistance decreases quite sharply during the initial stages of "follow." This provides an inherent sloping closure and break characteristic as compared with the usual abrupt closure or break. The latter is of utility in reducing circuit transients, in limiting high initial current discharges and possibly in reducing peak voltages generated from the breaking of inductive loads. Radio interference may be reduced as compared to a conventional contact by the sloping close and break characteristic and by the location of the impedance immediately at the contact area. Other advantages and utility of this feature will be evident to skilled persons.

Contact protection for inductive loads appears to be necessary with this type of contact to prevent rapid disintegration of the material. The use of resistance-capacitance networks for such protection of the usual metal type of contacting pairs is well known in the art. However, if circuit conditions permit the use of the series resistance, the contact pair can be engineered to inherently provide the resistance normally used externally with the protecting capacitance.

Due to the properties of rubber to absorb shock and vibration, one of the significant advantages of this conductive rubber type of contact is its ability to inhibit or prevent the undersirable phenomenon known to the art as contact "chatter." Laboratory tests indicate a complete freedom from fine or coarse "chatter" when a follow of .015" or more is provided on such contacts in the type of relay disclosed in Fig. 1 of the drawing.

The value of conductivity of conductive rubber is altered by flexing, swelling (when exposed to oils) and temperature so that at any moment the resistance is a function of the previous history of the material. Nevertheless, if due allowance is made for the above factors in engineering such contacts as disclosed herein, conductive rubber contacts possess a stable conductivity and even though severely aged and subjected to considerable flexing will in general retain its conductivity at a value sufficiently stable for the use indicated.

I append the following claims to set forth the scope of my invention.

What is claimed is:

1. A protective structure for relay contacts for inhibiting contact sparking and chatter and interlocking comprising a relay spring carrying a contact made of conductive rubber containing equal parts by weight of rubber and carbon black together with anti-aging and vulcanizing agents.

2. A protective structure for relay contacts for inhibiting contact sparking and chatter and interlocking comprising a relay spring carrying a contact made of a homogeneous mixture of rubber and carbon black.

3. In an electromagnetic relay, a protective structure for relay contacts for inhibiting contact sparking and chatter and interlocking comprising contact springs with contacts thereon and conductive rubber interposed between at least one of said contacts and its associated spring.

4. A protective structure for relay contacts for inhibiting contact sparking and chatter and interlocking comprising a contact carrying portion of a relay spring consisting of a surface of said spring portion, conducting adhesive thereon and a conductive rubber contact bonded to said spring portion surface by means of said adhesive.

5. A protective structure for relay contacts for inhibiting contact sparking and chatter and interlocking comprising a contact carrying portion of a relay spring consisting of a surface of said spring portion, conducting adhesive thereon, conductive rubber bonded to said spring portion surface by means of said adhesive, additional conductive adhesive on a surface of said rubber and a metal contact bonded to said rubber by means of said additional adhesive.

6. A protective structure for relay contacts for inhibiting contact sparking and chatter and interlocking comprising the combination of a relay spring carrying a contact on a portion of said spring, conductive rubber interposed between said spring portion and said contact and a conducting adhesive bonding the adjacent elements together.

7. In an electromagnetic relay, a protective structure for relay contacts for inhibiting contact sparking and chatter and interlocking comprising at least one electrical contact spring, an electrical contact located substantially at one end of said spring, said contact made of conductive rubber, and a conducting adhesive for securing said contact to said one end of said spring.

8. In an electromagnetic relay, a protective structure for relay contacts for inhibiting contact sparking and chatter and interlocking comprising at least one electrical contact spring, a contacting structure located substantially at one end of said spring, said structure comprising an area of said spring, a conducting adhesive on said area, a thickness of conductive rubber secured to said area by means of said adhesive, additional conducting adhesive on said rubber and a metallic contact secured to said rubber by means of said additional adhesive.

ALFRED K. SCHENCK.

REFERENCES CITED

The following references are of record in the file of this patent:

UNITED STATES PATENTS

| Number | Name | Date |
|---|---|---|
| 547,537 | Biddle et al. | Oct. 8, 1895 |
| 1,132,094 | Hosford | Mar. 16, 1915 |
| 1,300,022 | Richter | Apr. 8, 1919 |
| 1,501,330 | Gudge et al. | July 15, 1924 |
| 1,577,981 | Otto | Mar. 23, 1926 |
| 2,297,772 | Johnson | Oct. 6, 1942 |